(12) United States Patent
Srivastava et al.

(10) Patent No.: US 11,048,504 B2
(45) Date of Patent: Jun. 29, 2021

(54) PROVIDING OFFLINE MODE FOR MOBILE APPLICATIONS

(71) Applicant: SAP SE, Walldorf (DE)

(72) Inventors: Garima Srivastava, Bangalore (IN); Paulami Mitra, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/449,052

(22) Filed: Jun. 21, 2019

(65) Prior Publication Data
US 2020/0401401 A1 Dec. 24, 2020

(51) Int. Cl.
*G06F 8/77* (2018.01)
*G06F 16/27* (2019.01)

(52) U.S. Cl.
CPC ............ *G06F 8/77* (2013.01); *G06F 16/27* (2019.01)

(58) Field of Classification Search
CPC .............. G06F 8/65; G06F 8/77; G06F 16/27
USPC .................................................. 717/100–135
See application file for complete search history.

(56) References Cited

U.S. PATENT DOCUMENTS

| | | | |
|---|---|---|---|
| 7,353,196 B1 * | 4/2008 | Bobbitt | G06Q 40/00 705/35 |
| 7,966,426 B2 * | 6/2011 | Smith | G06Q 10/107 709/248 |
| 8,245,128 B1 | 8/2012 | Ahad et al. | |
| 8,359,574 B1 * | 1/2013 | Bannur | G06F 9/44505 717/120 |
| 9,171,049 B2 | 10/2015 | Hopkins | |
| 9,942,319 B2 | 4/2018 | Xi et al. | |
| 2005/0235012 A1 * | 10/2005 | Harry | G06F 8/71 |
| 2007/0078950 A1 * | 4/2007 | Hopkins | H04L 67/02 709/217 |
| 2013/0132463 A1 * | 5/2013 | Garcia-Ascanio | G06F 16/178 709/203 |
| 2013/0138608 A1 * | 5/2013 | Smith | G06F 16/27 707/610 |
| 2017/0131978 A1 | 5/2017 | Iyer et al. | |
| 2017/0331915 A1 * | 11/2017 | Jann | H04L 67/02 |
| 2020/0097334 A1 * | 3/2020 | Oliveros | G06F 1/3206 |

OTHER PUBLICATIONS

Yura, "Essential Guide to Making Your App Work Offline", May 11, 2017, downloaded from www.romexsoft.com on Mar. 13, 2019, 6 pages.

\* cited by examiner

*Primary Examiner* — Marina Lee
(74) *Attorney, Agent, or Firm* — Fountainhead Law Group P.C.

(57) ABSTRACT

Some embodiments provide a non-transitory machine-readable medium that stores a program. The program receives, from a client device, a project for an existing application. The program further receives from the client device a request to add an offline mode to the existing application. In response to receiving the request, the program also includes programming code in the project for implementing the offline mode in the existing application. The program further generates an application configured for execution on the client device. The application is a version of the existing application that includes the feature for operating the existing application in the offline mode.

17 Claims, 14 Drawing Sheets

FIG. 2F

```
File  Edit  Build  Run  Deploy  Search  View  Tools  Help
```

```
mobile-hybrid.js
```

- hybrid
  - logon.js
  - pulltorefresh.min.js
  - mobile-hybrid.js
  - index.html
- webapp
  - controller
    - App.controller.js
    - BaseController.js
    - Detail.controller.js
    - ErrorHandler.js
    - Master.controller.js
  - model
  - test
  - view

```
refreshStore: function() {
    console.log("Offline events: refreshStore");
    if (!store) {
        console.log("The store must be open before it can be refreshed");
        return;
    }
    store.refresh(sap.hybrid.refreshStoreCallback,
        sap.hybrid.errorCallback, null, sap.hybrid.progressCallback);
},
flushStore: function() {
    console.log("Offline events: flushStore");
    if (!store) {
        console.log("The store must be open before it can be flushed");
        return;
    }
    store.flush(sap.hybrid.flushStoreCallback, sap.hybrid.errorCallback,
        null, sap.hybrid.progressCallback);
},
```

Stage 208

FIG. 2H

```
File  Edit  Build  Run  Deploy  Search  View  Tools  Help
```

| hybrid | mobile-hybrid.js |
|---|---|
| logon.js | appLogon: function (appConfig) { |
| pulltorefresh.min.js | • • • |
| mobile-hybrid.js | if ('serverHost' in context && 'serverPort' in context && 'https' in |
| index.html | context) { |
| webapp | sap.hybrid.kapsel.doLogonInit(context, appConfig.appID, |
| controller | sap.hybrid.openStore); |
| App.controller.js | } else { |
| BaseController.js | console.error("context data for logon are not complete"); |
| Detail.controller.js | } |
| ErrorHandler.js | }, |
| Master.controller.js | • • • |
| model | |
| test | |
| view | |

Stage 209

FIG. 2I

PROVIDING OFFLINE MODE FOR MOBILE APPLICATIONS

BACKGROUND

With the relatively recent advent of mobile computing devices, different types of software was created specifically for such devices. For example, specific operating systems were designed and created to run on mobile computing devices in an efficient manner Software applications that were originally designed to operate on desktop computers or laptop computers were redesigned or rewritten to operate on mobile computing devices. Similarly, new software applications developed for mobile computing devices are typically developed differently than for versions developed for desktop computers and laptop computers. In addition, different versions of the same software application may need to be developed for different mobile device platforms.

SUMMARY

In some embodiments, a non-transitory machine-readable medium stores a program. The program receives, from a client device, a project for an existing application. The program further receives from the client device a request to add an offline mode to the existing application. In response to receiving the request, the program also includes programming code in the project for implementing the offline mode in the existing application. The program further generates an application configured for execution on the client device. The application is a version of the existing application that includes the feature for operating the existing application in the offline mode.

In some embodiments, the programming code may include instructions for creating a local storage on the client device, instructions for retrieving the data for the application from a computing system; and instructions for storing the data for the application in the local storage. The programming code may further include instructions for retrieving the data from the local storage and presenting the data on a display of the client device. The programming code may further include instructions for receiving modifications to the data for the application, instructions for storing the modifications to the data for the application in the local storage, instructions for determining that the client device has a connection to the computing system, instructions for, based on the determination, sending the modifications to the data for the application to the computing system in order for the computing system to synchronize the data for the application that is stored on the computing system with the data for the application store in the local storage.

In some embodiments the program may further receive from a user of the client device a request to synchronize the modifications to the data for the application stored in the local storage with the data stored in the computing system. The determining and the sending may be performed in response to receiving the request from the user of the client device. The client device may be a first client device. The existing application may be an application that has been implemented, compiled, and installed on a second client device.

In some embodiments, a method receives, from a client device, a project for an existing application. The method further receives from the client device a request to add an offline mode to the existing application. In response to receiving the request, the method also includes programming code in the project for implementing the offline mode in the existing application. The method further generates an application configured for execution on the client device. The application is a version of the existing application that includes the feature for operating the existing application in the offline mode.

In some embodiments, the programming code may include instructions for creating a local storage on the client device, instructions for retrieving the data for the application from a computing system; and instructions for storing the data for the application in the local storage. The programming code may further include instructions for retrieving the data from the local storage and presenting the data on a display of the client device. The programming code may further include instructions for receiving modifications to the data for the application, instructions for storing the modifications to the data for the application in the local storage, instructions for determining that the client device has a connection to the computing system, instructions for, based on the determination, sending the modifications to the data for the application to the computing system in order for the computing system to synchronize the data for the application that is stored on the computing system with the data for the application store in the local storage.

In some embodiments, the method may further receive from a user of the client device a request to synchronize the modifications to the data for the application stored in the local storage with the data stored in the computing system. The determining and the sending may be performed in response to receiving the request from the user of the client device. The client device may be a first client device. The existing application may be an application that has been implemented, compiled, and installed on a second client device.

In some embodiments, a system includes a set of processing units and a non-transitory machine-readable medium that stores instructions. The instructions cause at least one processing unit to receive, from a client device, a project for an existing application. The instructions further cause the at least one processing unit to receive from the client device a request to add an offline mode to the existing application. In response to receiving the request, the instructions also cause the at least one processing unit to include programming code in the project for implementing the offline mode in the existing application. The instructions further cause the at least one processing unit to generate an application configured for execution on the client device. The application is a version of the existing application that includes the feature for operating the existing application in the offline mode.

In some embodiments, the programming code may include instructions for creating a local storage on the client device, instructions for retrieving the data for the application from a computing system; and instructions for storing the data for the application in the local storage. The programming code may further include instructions for retrieving the data from the local storage and presenting the data on a display of the client device. The programming code may further include instructions for receiving modifications to the data for the application, instructions for storing the modifications to the data for the application in the local storage, instructions for determining that the client device has a connection to the computing system, instructions for, based on the determination, sending the modifications to the data for the application to the computing system in order for the computing system to synchronize the data for the application that is stored on the computing system with the data for the application store in the local storage.

In some embodiments, the instructions may cause at least one processing unit to receive from a user of the client device a request to synchronize the modifications to the data for the application stored in the local storage with the data stored in the computing system. The determining and the sending may be performed in response to receiving the request from the user of the client device.

The following detailed description and accompanying drawings provide a better understanding of the nature and advantages of the present invention.

BRIEF DESCRIPTION OF THE DRAWINGS

FIGS. 2A-2I illustrate an example graphical user interface (GUI) for providing an offline mode for a mobile application according to some embodiments.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for providing an offline mode for mobile applications. In some embodiments, a computing system includes an integrated development environment (IDE) application that may be accessible and used by client devices to develop software applications for mobile devices. The IDE application may include a feature that automatically provides an offline mode for existing software applications for mobile devices. To use such a feature, a user of a client device may access the IDE application via a web browser operating on the client device to open and/or import a project for an existing software application (e.g., a software application that has been developed and distributed for installation on mobile devices). Next, the user of the client device can navigate to an option in the IDE application for adding an offline mode for the existing software application and select the option. In response, the computing system automatically generates programming code and adds them to the project. The computing system also modifies some existing programming code in the project. Finally, the IDE application generates a version of the existing software application that includes the offline mode, which can be distributed to mobile devices so they can install and use this version of the existing software application.

The techniques described in the present application provide a number of benefits and advantages over conventional mobile software applications. For instance, by providing an offline mode feature for a mobile software application operating on a mobile device, the mobile device is able to maintain functionalities, which would be non-functional in conventional mobile software applications, when the mobile device does not have a connection to the Internet. For example, in a conventional mobile software application that uses data stored in another computing device (e.g., a server computer), such a mobile software application does not allow user to modify, add, or delete data stored in the other computing device unless the mobile software application has a connection to the other computing device, such as the Internet. However, the same mobile software application that has an offline mode has a mechanism that will allow the user to perform modification, addition, or deletion operations on the data when the mobile software application does not have a connection to the other computing device.

Figure 1:
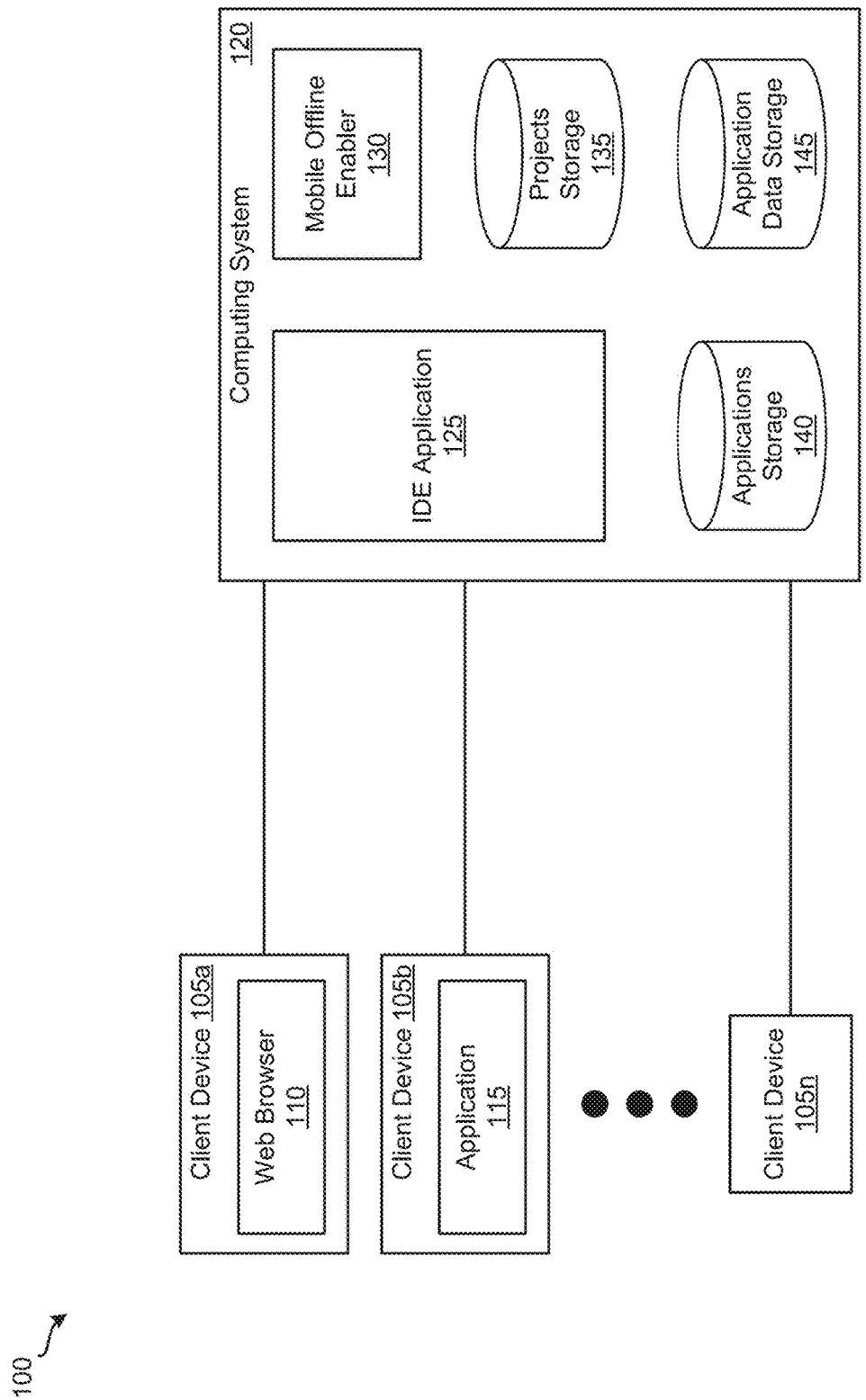
FIG. 1 illustrates a system for providing an offline mode for mobile applications according to some embodiments.

FIG. 1 illustrates a system 100 for providing an offline mode for mobile applications according to some embodiments. As shown, system 100 includes client devices 105a-n and computing system 120. Each of client devices 105a-n can be configured to communicate and interact with computing system 110 in a variety of different ways. For example, FIG. 1 illustrates client device 105a including web browser 110. Web browser 110 is a web browser application that is installed and executed on client device 105a. A user of client device 105a may use web browser 110 to access and interact with web sites, web pages, web applications, etc. For instance, a user of client device 105a can use web browser 110 to access and interact with IDE application 125 to develop software applications. FIG. 1 also illustrates client device 105b including application 115. In some embodiments, application 115 is a software application that is installed and executed on client device 105b. In some cases, client device 105b is a mobile device (e.g., a tablet, a smartphone, etc.) and application 115 is a mobile software application. In some such cases, application 115 is a mobile software application developed by a user of client device 105a using IDE application 125. The mobile software application can include an offline mode feature that allows the user of application 115 to continue using it when client device 105b does not have a connection to computing system 120 (e.g., does not have a connection to the Internet). While FIG. 1 shows web browser 110 included in client device 105a and application 115 included in client device 105b, one of ordinary skill in the art will understand that each of the client devices 105 may include web browser 110, application 115, or both web browser 110 and application 115.

In some embodiments, a software application (e.g., application 115) that has an offline mode feature is able to continue operating even though the mobile device (e.g., client device 105b) on which the software application is operating cannot communicate with other devices (e.g., the mobile device does not have access to a Wi-Fi connection to the Internet, the mobile device does not have a cellular connection to the Internet, etc.). For example, some of the data used for the software application may be managed by and stored on a different computing device (e.g., computing device 120). To get this data, the software application typically sends a request to the computing device for the data and, in return, receives the requested data from the computing device. The software application may then process the retrieved data, present it on a display of the mobile device, modify the data, add new data to the data, remove data from the data, etc. The offline mode feature of the software application has a mechanism that will allow a user of the software application perform operations (e.g., modifications, additions, deletions, etc.) on the data when the software application does not have a connection to the computing device.

As shown in FIG. 1, computing system 120 includes IDE application 125, mobile offline enabler 130, and storages 135-145. Projects storage 135 is configured to store projects for software applications. In some embodiments, a project for a software application includes a project name for identifying the project. A project is configured for organizing programming code for implementing a software application. For instance, a project may specify a set of files that belong to the project and specify a set of folders and the manner in which the set of files are organized in the set of folders. Each file in the set of files can include portions of the programming code for implementing the software application. Applications storage 140 stores applications developed using and generated by IDE application 125. In some embodiments, applications stored in applications storage 140 may be sent to platforms for distributing to mobile devices. In some instances, applications stored in applications storage 140 can be downloaded directly by a client device (e.g., a client device 105). Application data storage 145 is configured to store data used by applications (e.g., application 115, applications developed using IDE application 125 and distributed to client devices, etc.). In some embodiments, storages 135-145 are implemented in a single physical storage while, in other embodiments, storages 135-145 may be implemented across several physical storages. While FIG. 1 shows storages 135-145 as part of computing system 120, one of ordinary skill in the art will appreciate that projects storage 135, applications storage 140, and/or application data storage 145 may be external to computing system 120 in some embodiments.

IDE application 125 is a software application operating on computing system 120 that is configured to provide tools for and facilitate development of software applications. Examples of such tools include a source code editor, build tools, testing tools, debugging tools, etc. In some embodiments, IDE application 125 provides a graphical user interface (GUI) through which IDE application 125 provides such tools. IDE application 125 can receive a number of different requests from client devices 105a-n. For instance, IDE application 125 may receive from a client device (e.g., client device 105a) a request to import a project for a software application. In response, IDE application 125 retrieves the project for the software application from the client device 105. As another example, IDE application 125 can receive a request from a client device 105 (e.g., client device 105a) to provide an offline mode for a project of a software application being developed in IDE application 125. In response to receiving the request, IDE application 125 sends the request to mobile offline enabler 130 and gives mobile offline enabler 130 access to the project for the software application. When IDE application 125 receives a notification from mobile offline enabler 130 that it has finished, IDE application 125 generates the software application, which includes the offline mode provided by mobile offline enabler 130, and stores the software application applications storage 140. Alternatively, or in conjunction with storing the application in applications storage 140, IDE application 125 can send the generated application to a client device 105 (e.g., the client device 105 used to develop the application using IDE application 125). In some embodiments, IDE application 125 does not generate the software application in response to the notification. Instead, IDE application 125 generates it when IDE application 125 receives a request from a client device (e.g., client device 105a) to generate a software application.

Mobile offline enabler 130 is configured to provide offline modes for mobile applications being developed using IDE application 125. For example, mobile offline enabler 130 may receive a request from IDE application 125 to provide an offline mode for a software application along with access to a project for the software application. Mobile offline enabler 130 processes the request by adding a set of folders to the project for the software application. Net, mobile offline enabler 130 adds a set of new files to the set of folders. Mobile offline enabler 130 then generates programming code and adds them to some of the new files. Also, mobile offline enabler 130 modifies some of the existing programming code in some of the existing files in the project for the software application. After mobile offline enabler 130 is finished adding programming code to the project and modifying existing programming code in the project, mobile offline enabler 130 sends IDE application 125 a notification that it is finished providing the offline mode for the software application. In some embodiments, mobile offline enabler 130 is implemented as a plug-in to IDE application 125. Mobile offline enabler 130 may be implemented as a service provided by computing system 120.

An example operation will now be described by reference to FIGS. 2A-2I, which illustrate an example GUI 200 for providing an offline mode for a mobile application according to some embodiments. Specifically, FIGS. 2A-2I illustrate GUI 200 at nine different stages 201-209 of providing an offline mode for a mobile application. For this example, IDE application 125 is providing GUI 200 to web browser 110 of client device 105a. The example operation starts by a user of client device 105a using web browser 110 to access IDE application 125 and import into IDE application 125 a project for an existing mobile application that does not have an offline mode. In some embodiments an existing mobile application is a mobile application that has implemented (e.g., programmed), compiled, and installed on client devices (or distributed for installation on client devices).

Figure 2A:
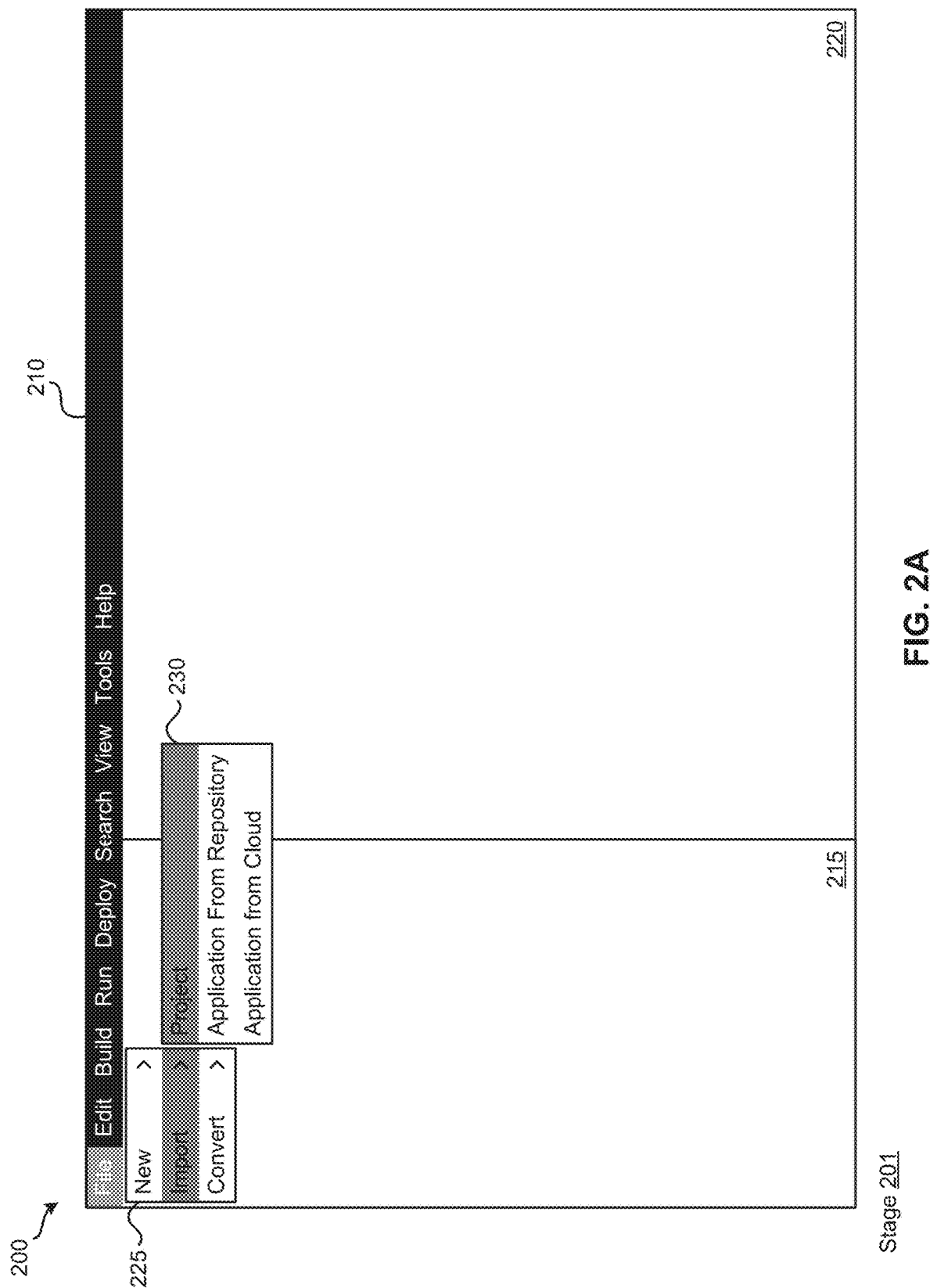

FIG. 2A illustrates a user of client device 105a using web browser 110 to import a project for an existing mobile application into IDE application 125. In particular, FIG. 2A shows the first stage 201 of GUI 200, which includes toolbar 210, display area 215, and display area 220. As shown, toolbar 210 includes several selectable user interface (UI) items for performing various operations. In this example, the user of client device 105a has selected the UI item (i.e., the "File" button in this example) for providing menu 225, which includes several selectable UI items. Display area 215 is configured for displaying projects of software applications. Display area 220 is for providing a source code editor that is used to display and edit source code of software applications.

As shown in FIG. 2A, the user of client device 105a has selected an import option in menu 225, as indicated by a grey highlighting of the UI item. The selection of this option causes IDE application 125 to provide menu 230, which includes several selectable UI items. In this example, the user of client device 105a has selected the UI item for importing a project into IDE application 125, as indicated by a grey highlighting of the UI item. In response to receiving the selection of the UI item for importing a project into IDE application 125, IDE application 125 prompts the user of client device 105a to specify where to retrieve the project. When the project is located locally on client device 105a, the user of client device 105a can specify where the project is stored locally on client device 105a (e.g., a file path of the location where the project is stored). In some cases, the project is stored on another computing device. In some such cases, the user of client device 105a may provide IDE application 125 connection information for connecting to a computing system storing the project for the existing mobile application. After receiving input from the user of client device 105*a*, IDE application 125 retrieves the project for the existing mobile application from the location specified by the user of client device 105*a*.

Figure 2B:
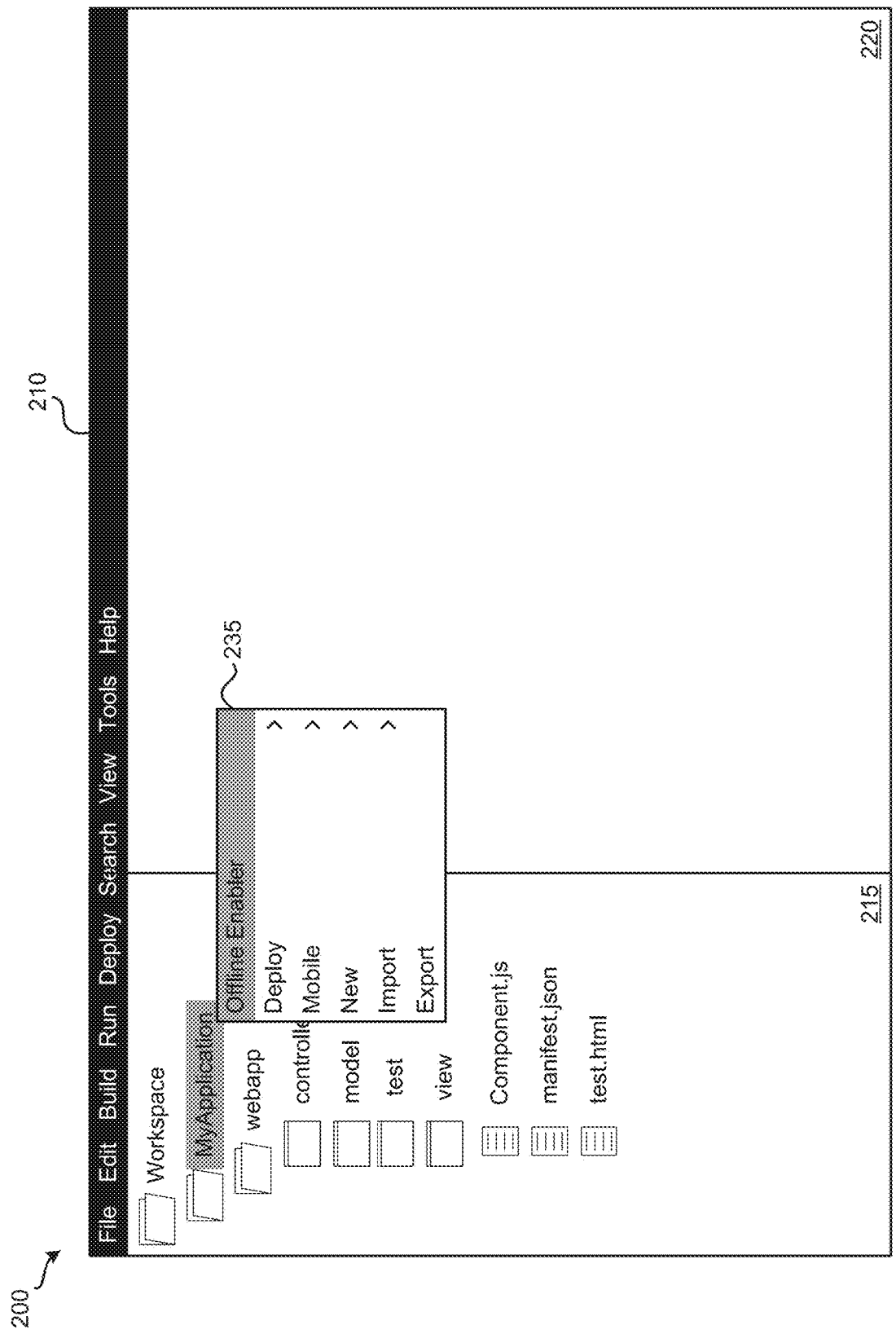

FIG. 2B illustrates GUI 200 after importing the project for the existing mobile application. As shown in the second stage 202, GUI 200 is presenting the structure of the project for the existing mobile application in display area 215. In this example, the project for the mobile application is named MyApplication. As shown in FIG. 2B, the project folder for the mobile application includes a webapp folder, which includes a controller folder, a model folder, a test folder, a view folder, a Component.js file, a manifest.json file, and a test.html file. In the second stage 202 of GUI 200, the user of client device 105*a* has selected the project folder (e.g., by performing a right-click operation or the like on the project folder), as indicated by a grey highlighting of the project folder. The selection of the project folder caused IDE application 125 to present menu 235, which includes several selectable UI items. For this example, the user of client device 105*a* has selected a UI item, as indicated by a grey highlighting of the UI item in menu 235, for requesting an offline mode to be added to the mobile application. In response to receiving the selection, IDE application 125 sends mobile offline enabler 130 a request to provide an offline mode for the mobile application and provides offline enabler 130 access to the project for the mobile application.

Figure 2C:
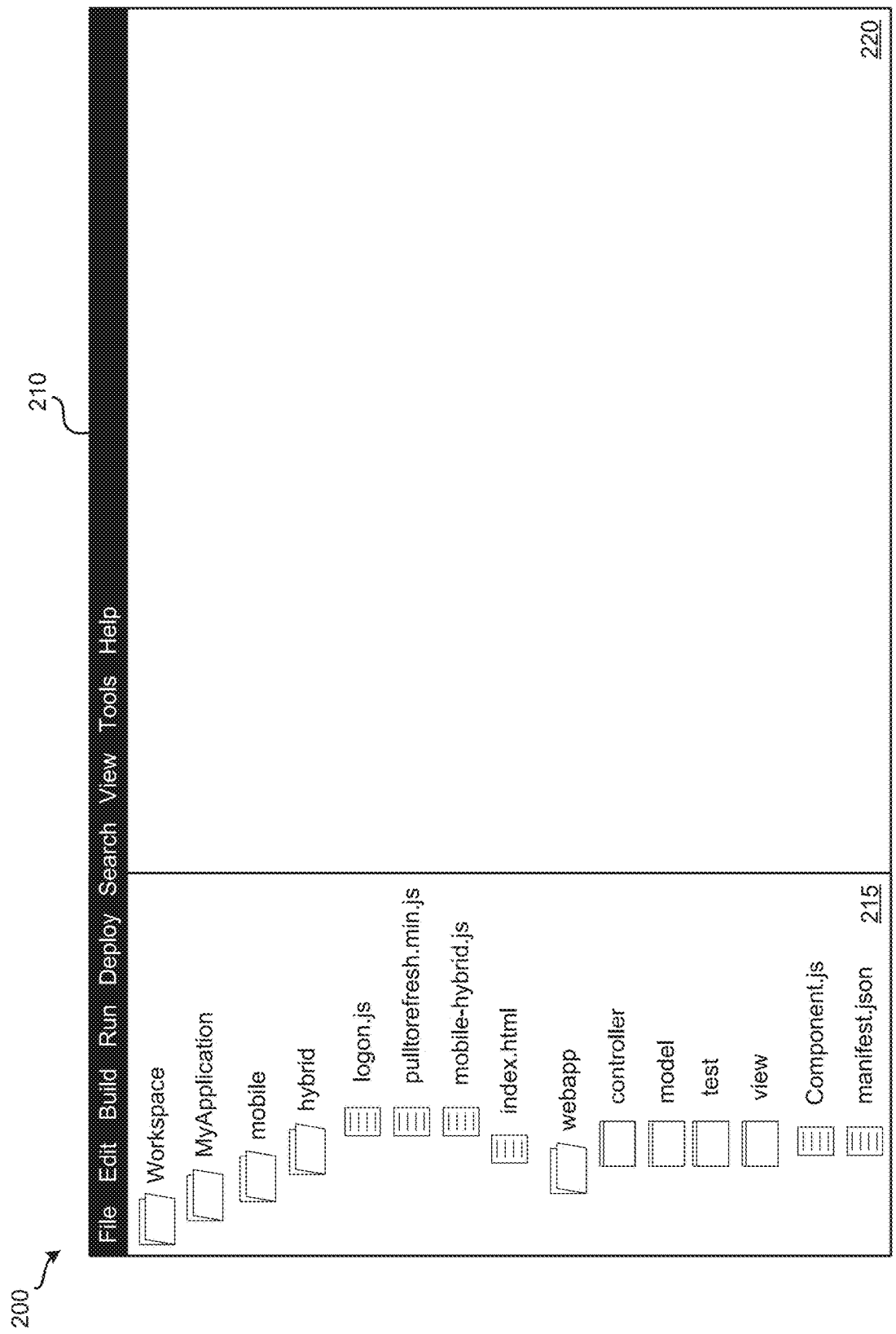

Upon receiving the request, mobile offline enabler 130 accesses the project and triggers the addition of a set of folders and a set of files to the project for the mobile application. In some embodiments, IDE application 125 provides services for adding folders and files to a project. In some such embodiments, mobile offline enabler 130 triggers the addition of a set of folders and a set of files to the project for the mobile application through such services provided by IDE application 125. FIG. 2C illustrates GUI 200 after mobile offline enabler 130 adds the set of folders and the se of files to the project of the mobile application. As illustrated in the third stage 203 in FIG. 2C, GUI 200 is displaying in display area 215 a set of folders that mobile offline enabler 130 has added to the project folder. In particular, mobile offline enabler 130 has added a mobile folder to the project folder. As shown, the mobile folder includes an index.html file and a hybrid folder, which includes a logon.js file, a pulltorefresh.min.js file, and a mobile-hybrid.js file.

Figure 2D:
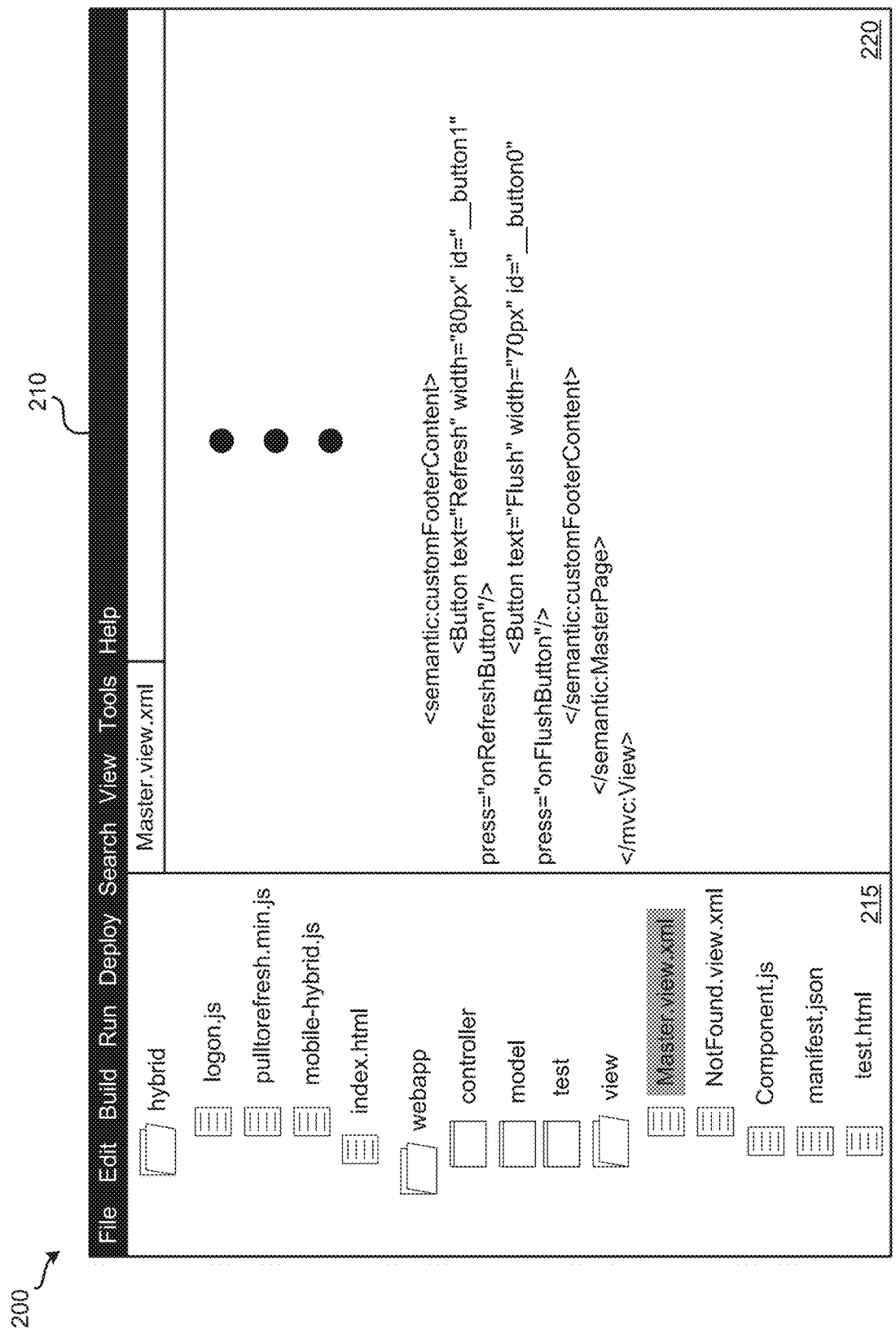
Figure 2E:
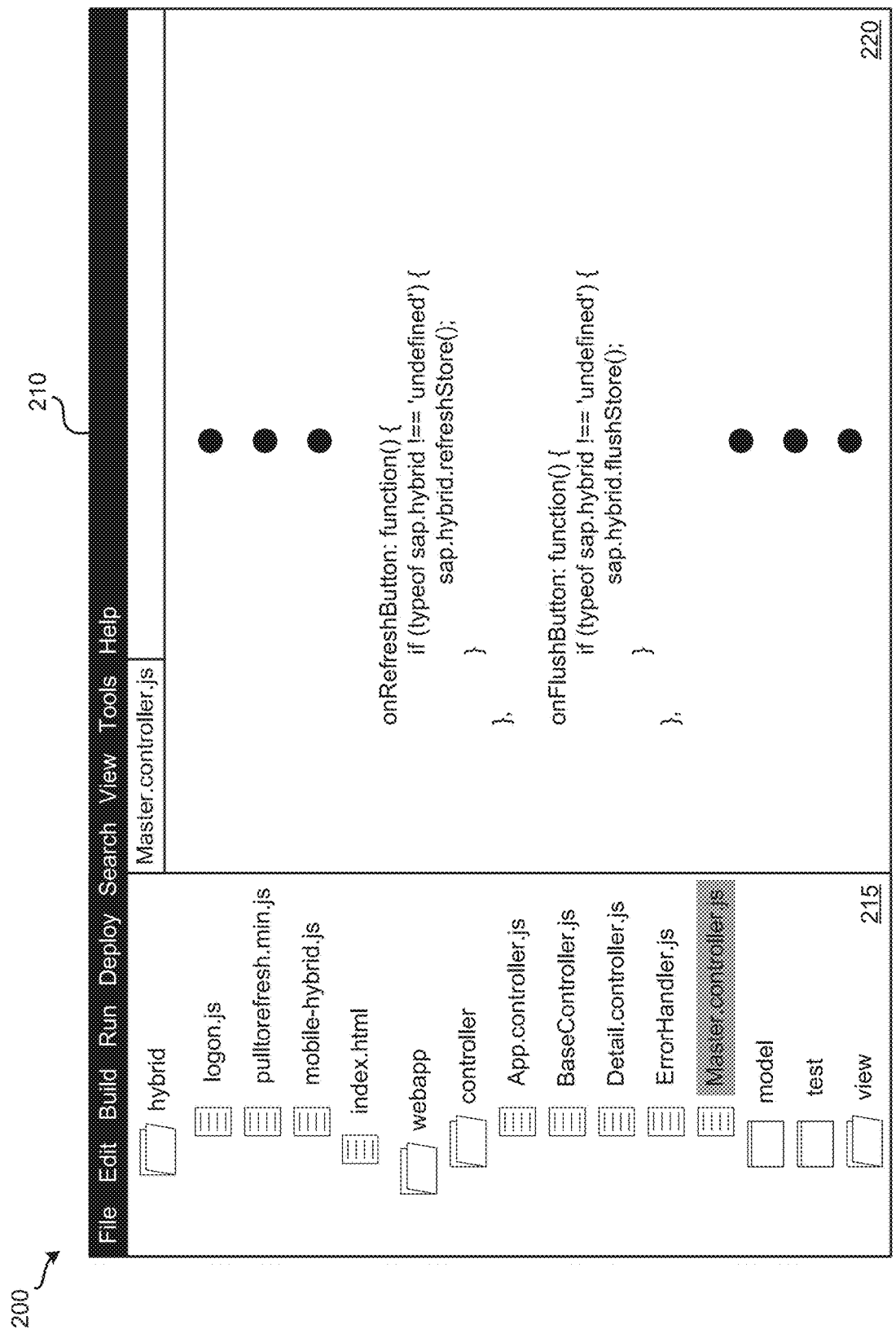
Figure 2F:
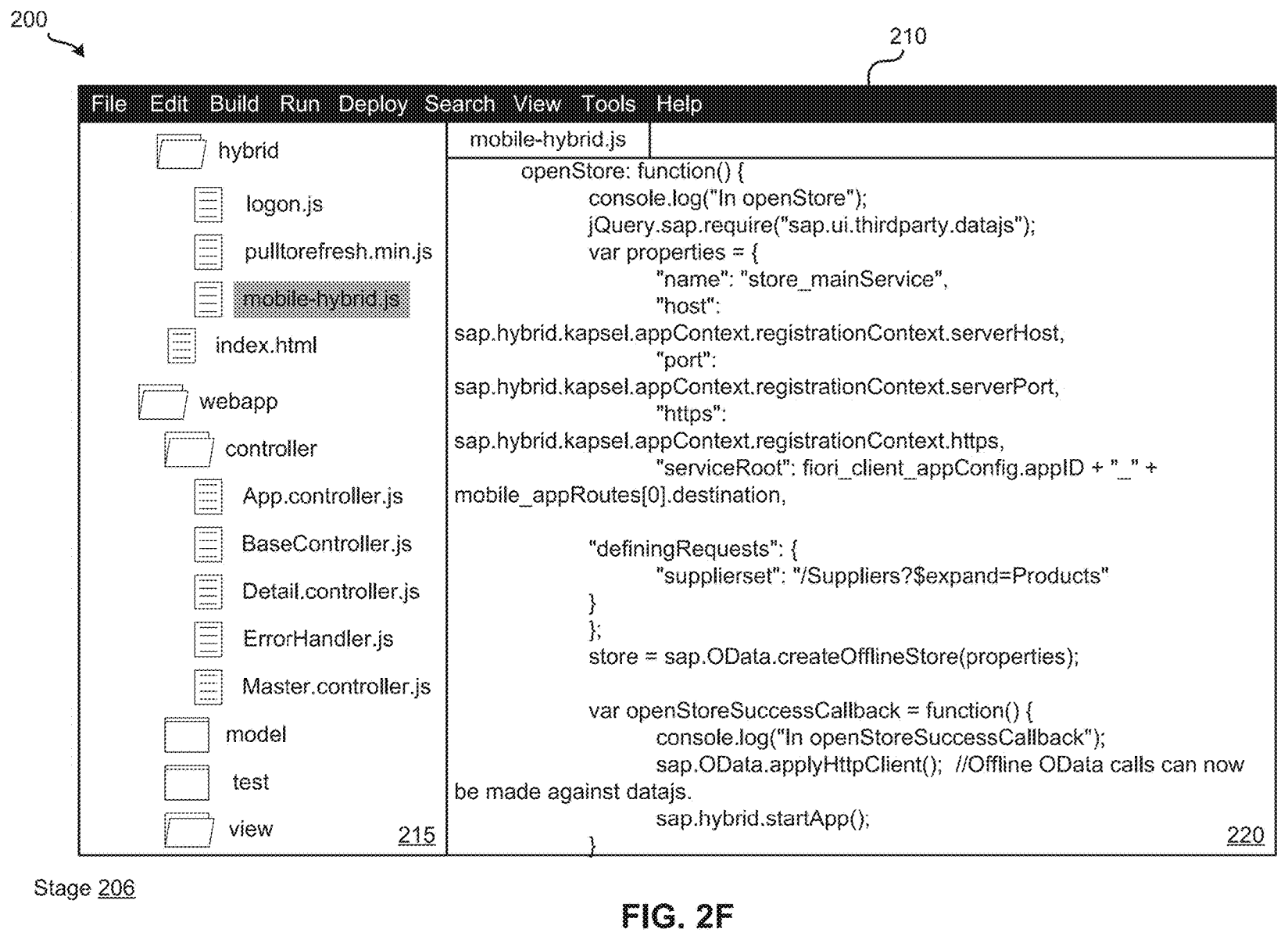
Figure 2G:
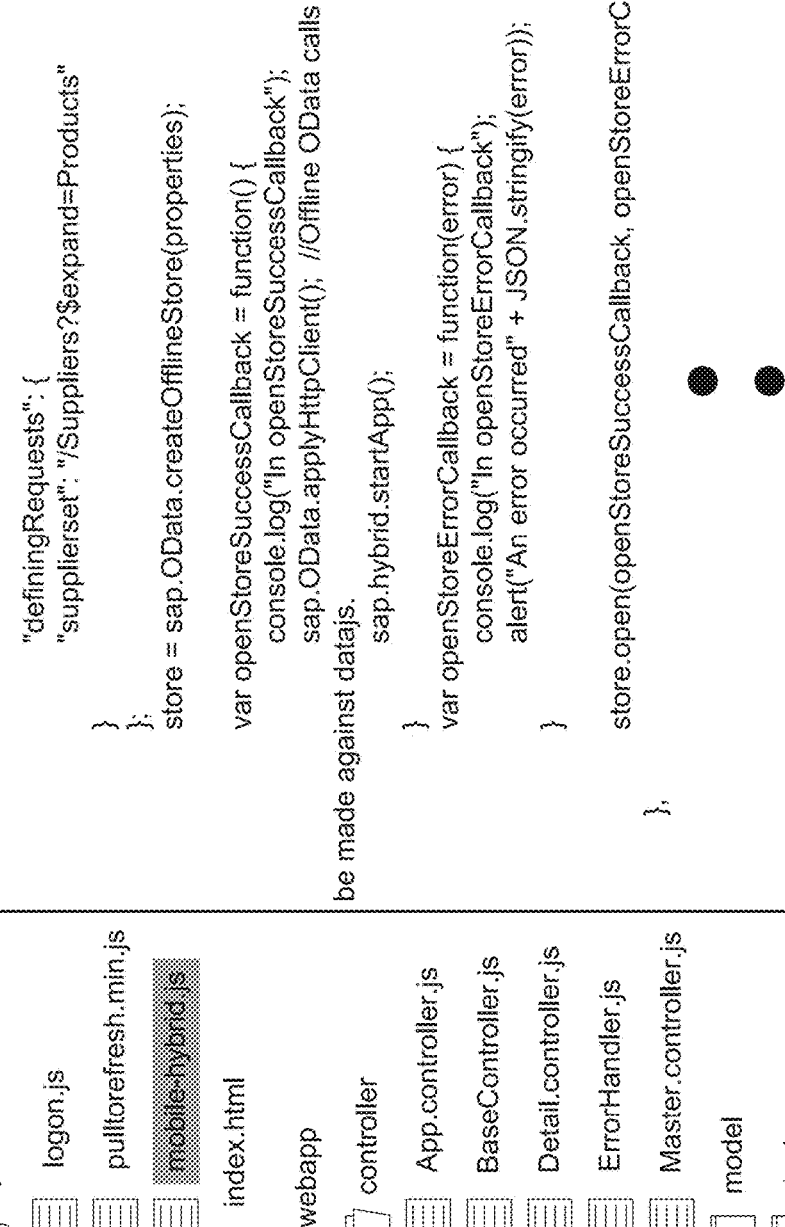

In addition to adding the set of folders and the set of files to the project for the mobile application, mobile offline enabler 130 generates programming code and adds it to existing files in the project in order to provide an offline mode for the mobile application. FIG. 2D illustrates an example of programming code that mobile offline enabler 130 generated and added to existing files in the project for the mobile application. Specifically, the fourth stage 204 of GUI 200 illustrates programming code generated by mobile offline enabler 130 that has been added to the Master-.View.xml file in the view folder. As shown, the programming code added to the Master.View.xml file includes instructions for defining two selectable UI items: a Refresh button and a Flush button. Another example of programming code that mobile offline enabler 130 generated and added to existing files in the project for the mobile application is illustrated in FIG. 2E. FIG. 2E illustrates the fifth stage 205 of GUI 200, which shows programming code generated by mobile offline enabler 130 that has been added to the Master.controler.js file in the controller folder. The programming code added to the Master.controler.js file includes instructions for defining two functions: a function for the Refresh button that is triggered when the Refresh button is selected and a function for the Flush button that is triggered when the Flush button is selected.

To provide an offline mode for the mobile application, mobile offline enabler 130 also generates programming code and adds it to the newly added set of files in the project. FIGS. 2F-2I illustrate examples of programming code that mobile offline enabler 130 generated and added to one of the files mobile offline enabler 130 added to the project. In particular, the sixth stage 206 of GUI 200 shows programming code generated by mobile offline enabler 130 that has been added to the mobile-hybrid.js file in the hybrid folder. As illustrated, the programming code added to the mobile-hybrid.js file includes instructions for defining an openStore function. For this example, mobile offline enabler 130 generated the programming code for properties variable (var properties in this example) by obtaining values for the different properties (i.e., name, host, port, https, and service-Root in this example) of the data source from an existing file in the project (not shown). The values for the properties variables specifies the location of a data source (e.g., computing system 120) from which a created local storage (referred to as store in this example) retrieves data. The programming code after the properties variable include instructions for defining requests for data. The next section of programming code includes instructions for creating a local storage based on the properties variable. The last line of programming code illustrated in the seventh stage 207 of GUI 200 shown in FIG. 2G includes instructions for opening the local storage so that it can be used to store data. FIG. 2H illustrates the eighth stage 208 of GUI 200, which shows programming code generated by mobile offline enabler 130 and added to the mobile-hybrid.js file. In the eighth stage 208, the programming code includes instructions for implementing the function for the Refresh button and instructions for implementing the function for the Flush button. The instructions for implementing the function for the Refresh button can include instructions for sending a computing system managing data for the mobile application a request for the latest data for the application. The instructions for implementing the function for the Flush button can include instructions for receiving from a user of the client device a request to synchronize modifications to data for the mobile application stored in the local storage with data stored in a computing system.

Mobile offline enabler 130 may also provide an offline mode for the mobile application by extracting existing programming code in the project and modifying it. FIG. 2I illustrates an example of existing programming code that mobile offline enabler 130 extracted from the project for the mobile application and added to one of the files mobile offline enabler 130 added to the project. Specifically, the ninth stage 209 of GUI 200 shows programming code generated by mobile offline enabler 130 that has been extracted from an existing file on the project (not shown, modified, and then added to the mobile-hybrid.js file. The programming code shown in the ninth stage 209 includes instructions implementing an appLogon function for performing operations upon a user initially logging into the mobile application. Mobile offline enabler 130 modified the last argument in the function specified to be executed when the if statement is true. Specifically, mobile offline enabler 130 modified the last argument to reference the openStore function. Before mobile offline enabler 130 modified that argument, it referenced a different function.

FIGS. 2D-2I illustrate some examples of mobile offline enabler 130 generating programming code, adding programming code to a project for a mobile application, and modifying existing code in the project for the mobile application when providing an offline mode for the mobile application. Mobile offline enabler 130 generates and adds many other programming code to the project for the mobile application. Some examples include programming code that includes instructions for retrieving data for the mobile application from a computing system (e.g., computing system 120); programming code that includes instructions for storing the data for the application in the local storage, programming code that includes instructions for retrieving the data from the local storage and presenting the data on a display of the client device, programming code that includes instructions for receiving modifications to the data for the application, programming code that includes instructions for storing the modifications to the data for the application in the local storage, programming code that includes instructions for determining that the client device has a connection to the computing system, programming code that includes instructions for sending, based on the determination, the modifications to the data for the application to the computing system in order for the computing system to synchronize the data for the application that is stored on the computing system with the data for the application store in the local storage.

After mobile offline enabler 130 finishes providing an offline mode for the mobile application, mobile offline enabler 130 sends IDE application 125 a notification that it is finished providing the offline mode for the software application. In response to the notification, IDE application 125 generates the software application and stores the software application applications storage 140. Alternatively, or in conjunction with storing the application in applications storage 140, IDE application 125 may send the generated application to client device 105a.

Figure 3:
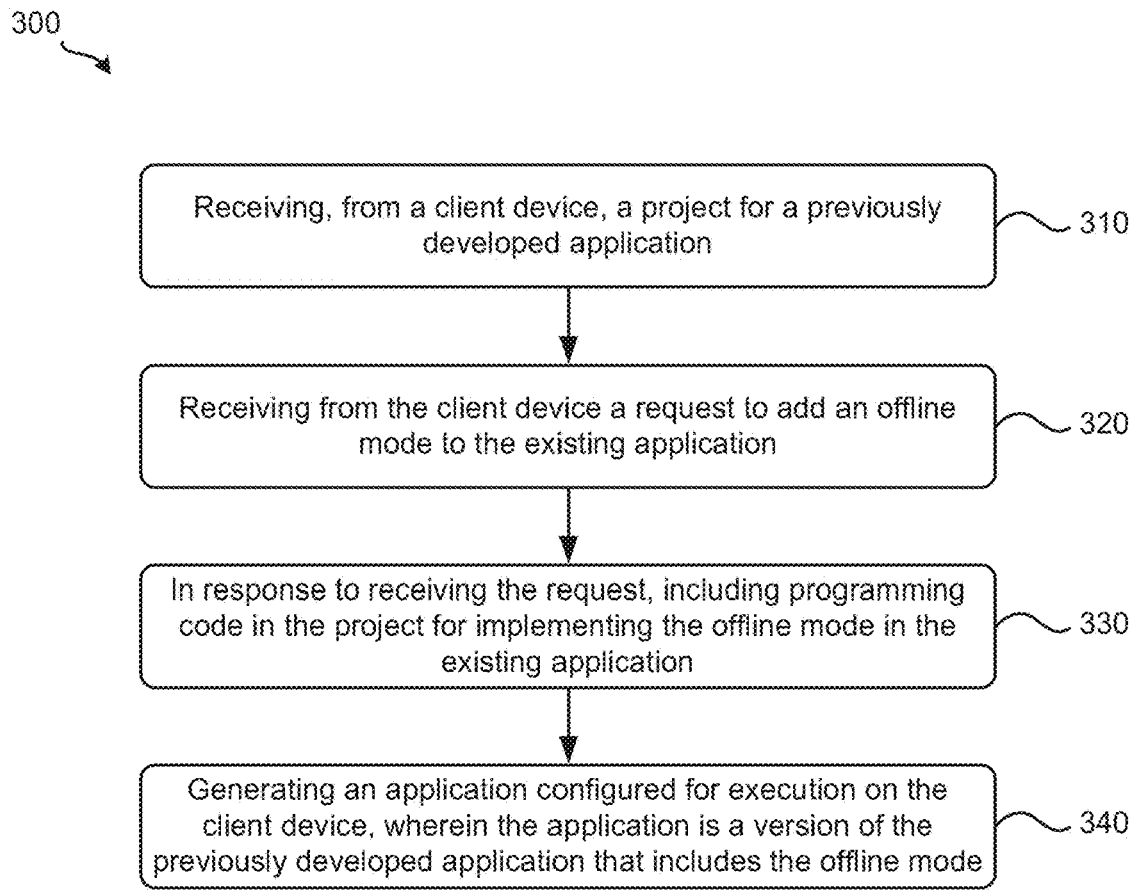
FIG. 3 illustrates a process for providing an offline mode for a mobile application according to some embodiments.

FIG. 3 illustrates a process 300 for providing an offline mode for a mobile application according to some embodiments. In some embodiments, computing system 120 performs process 300. Process 300 starts by receiving, at 310, from a client device, a project for an existing application. Referring to FIGS. 1 and 2A as an example, IDE application 125 may receive a project for an existing mobile application from client device 105a. IDE application 125 may perform operation 310 in response to IDE application 125 receiving a selection of the UI item in menu 230 for importing a project into IDE application 125.

Next, process 300 receives, at 320, from the client device a request to add an offline mode to the existing application. Referring to FIGS. 1 and 2B as an example, IDE application 125 receives the request from client device 105a. IDE application 125 can receive the request by receiving a selection of the UI item in menu 235 for requesting an offline mode to be added to the mobile application. In response to receiving the request, process 300 includes, at 330, programming code in the project for implementing the offline mode in the existing application. Referring to FIG. 1 as an example, mobile offline enabler 130 includes programming code in the project for implementing the offline mode in the existing mobile application. Examples of such programming code are illustrated in FIGS. 2D-2I.

Finally, process 300 generates, at 300, an application configured for execution on the client device. The application is a version of the existing application that includes the offline mode. Referring to FIG. 1 as an example, IDE application 125 generates the mobile application that is a version of the existing mobile application that includes the offline mode. In some instances, IDE application 125 generates the mobile application when IDE application 125 receives a notification from mobile offline enabler 130 that it has finished adding the offline mode to the project for the mobile application. In other instances, IDE application 125 generates the mobile application when IDE application 125 receives a request from a client device 105 to generate the mobile application.

Figure 4:
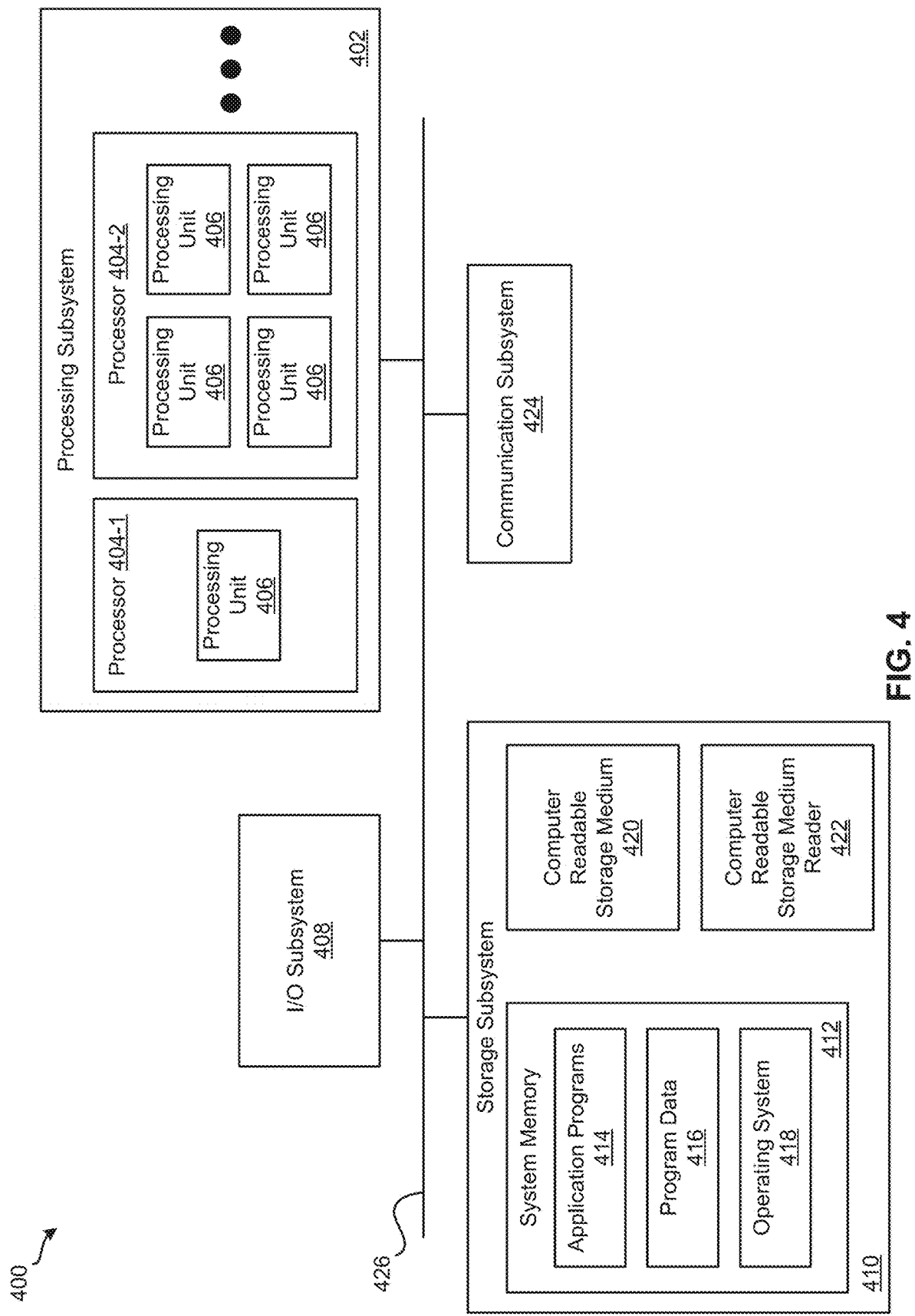
FIG. 4 illustrates an exemplary computer system, in which various embodiments may be implemented.

FIG. 4 illustrates an exemplary computer system 400 for implementing various embodiments described above. For example, computer system 400 may be used to implement client devices 105a-n and computing system 120. Computer system 400 may be a desktop computer, a laptop, a server computer, or any other type of computer system or combination thereof. Some or all elements of web browser 110, application 115, IDE application 125, mobile offline enabler 130, or combinations thereof can be included or implemented in computer system 400. In addition, computer system 400 can implement many of the operations, methods, and/or processes described above (e.g., process 300). As shown in FIG. 4, computer system 400 includes processing subsystem 402, which communicates, via bus subsystem 426, with input/output (I/O) subsystem 408, storage subsystem 410 and communication subsystem 424.

Bus subsystem 426 is configured to facilitate communication among the various components and subsystems of computer system 400. While bus subsystem 426 is illustrated in FIG. 4 as a single bus, one of ordinary skill in the art will understand that bus subsystem 426 may be implemented as multiple buses. Bus subsystem 426 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 402, which can be implemented as one or more integrated circuits (e.g., a conventional microprocessor or microcontroller), controls the operation of computer system 400. Processing subsystem 402 may include one or more processors 404. Each processor 404 may include one processing unit 406 (e.g., a single core processor such as processor 404-1) or several processing units 406 (e.g., a multicore processor such as processor 404-2). In some embodiments, processors 404 of processing subsystem 402 may be implemented as independent processors while, in other embodiments, processors 404 of processing subsystem 402 may be implemented as multiple processors integrate into a single chip or multiple chips. Still, in some embodiments, processors 404 of processing subsystem 402 may be implemented as a combination of independent processors and multiple processors integrated into a single chip or multiple chips.

In some embodiments, processing subsystem 402 can execute a variety of programs or processes in response to program code and can maintain multiple concurrently executing programs or processes. At any given time, some or all of the program code to be executed can reside in processing subsystem 402 and/or in storage subsystem 410. Through suitable programming, processing subsystem 402 can provide various functionalities, such as the functionalities described above by reference to process 300, etc.

I/O subsystem 408 may include any number of user interface input devices and/or user interface output devices.

User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 400 to a user or another device (e.g., a printer).

As illustrated in FIG. 4, storage subsystem 410 includes system memory 412, computer-readable storage medium 420, and computer-readable storage medium reader 422. System memory 412 may be configured to store software in the form of program instructions that are loadable and executable by processing subsystem 402 as well as data generated during the execution of program instructions. In some embodiments, system memory 412 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 412 may include different types of memory, such as static random access memory (SRAM) and/or dynamic random access memory (DRAM). System memory 412 may include a basic input/output system (BIOS), in some embodiments, that is configured to store basic routines to facilitate transferring information between elements within computer system 400 (e.g., during start-up). Such a BIOS may be stored in ROM (e.g., a ROM chip), flash memory, or any other type of memory that may be configured to store the BIOS.

As shown in FIG. 4, system memory 412 includes application programs 414 (e.g., application 115, IDE application 125, etc.), program data 416, and operating system (OS) 418. OS 418 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 420 may be a non-transitory computer-readable medium configured to store software (e.g., programs, code modules, data constructs, instructions, etc.). Many of the components (e.g., web browser 14, application 115, IDE application 125, and mobile offline enabler 130) and/or processes (e.g., process 300) described above may be implemented as software that when executed by a processor or processing unit (e.g., a processor or processing unit of processing subsystem 402) performs the operations of such components and/or processes. Storage subsystem 410 may also store data used for, or generated during, the execution of the software.

Storage subsystem 410 may also include computer-readable storage medium reader 422 that is configured to communicate with computer-readable storage medium 420. Together and, optionally, in combination with system memory 412, computer-readable storage medium 420 may comprehensively represent remote, local, fixed, and/or removable storage devices plus storage media for temporarily and/or more permanently containing, storing, transmitting, and retrieving computer-readable information.

Computer-readable storage medium 420 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 424 serves as an interface for receiving data from, and transmitting data to, other devices, computer systems, and networks. For example, communication subsystem 424 may allow computer system 400 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 424 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 424 may provide components configured for wired communication (e.g., Ethernet) in addition to or instead of components configured for wireless communication.

One of ordinary skill in the art will realize that the architecture shown in FIG. 4 is only an example architecture of computer system 400, and that computer system 400 may have additional or fewer components than shown, or a different configuration of components. The various components shown in FIG. 4 may be implemented in hardware, software, firmware or any combination thereof, including one or more signal processing and/or application specific integrated circuits.

Figure 5:
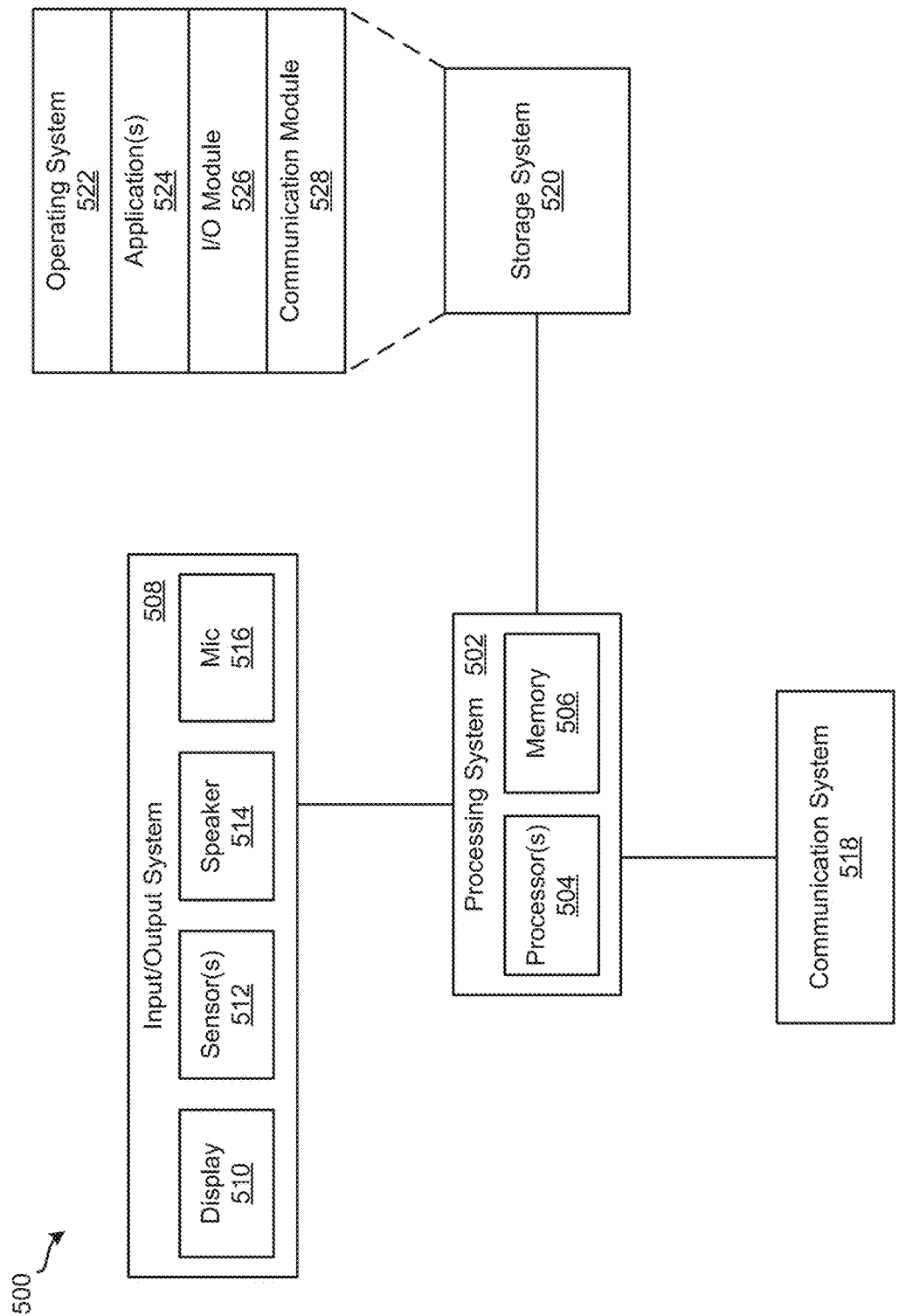
FIG. 5 illustrates an exemplary computing device, in which various embodiments may be implemented.

FIG. 5 illustrates an exemplary computing device 500 for implementing various embodiments described above. For example, computing device 500 may be used to implement client devices 105a-n. Computing device 500 may be a cellphone, a smartphone, a wearable device, an activity tracker or manager, a tablet, a personal digital assistant (PDA), a media player, or any other type of mobile computing device or combination thereof. Some or all elements of web browser 110, application 115, or combinations thereof can be included or implemented in computing device 500. As shown in FIG. 5, computing device 500 includes processing system 502, input/output (I/O) system 508, communication system 518, and storage system 520. These components may be coupled by one or more communication buses or signal lines.

Processing system 502, which can be implemented as one or more integrated circuits (e.g., a conventional microprocessor or microcontroller), controls the operation of computing device 500. As shown, processing system 502 includes one or more processors 504 and memory 506. Processors 504 are configured to run or execute various software and/or sets of instructions stored in memory 506 to perform various functions for computing device 500 and to process data.

Each processor of processors 504 may include one processing unit (e.g., a single core processor) or several processing units (e.g., a multicore processor). In some embodiments, processors 504 of processing system 502 may be implemented as independent processors while, in other embodiments, processors 504 of processing system 502 may be implemented as multiple processors integrate into a single chip. Still, in some embodiments, processors 504 of processing system 502 may be implemented as a combination of independent processors and multiple processors integrated into a single chip.

Memory 506 may be configured to receive and store software (e.g., operating system 522, applications 524, I/O module 526, communication module 528, etc. from storage system 520) in the form of program instructions that are loadable and executable by processors 504 as well as data generated during the execution of program instructions. In some embodiments, memory 506 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 508 is responsible for receiving input through various components and providing output through various components. As shown for this example, I/O system 508 includes display 510, one or more sensors 512, speaker 514, and microphone 516. Display 510 is configured to output visual information (e.g., a graphical user interface (GUI) generated and/or rendered by processors 504). In some embodiments, display 510 is a touch screen that is configured to also receive touch-based input. Display 510 may be implemented using liquid crystal display (LCD) technology, light-emitting diode (LED) technology, organic LED (OLED) technology, organic electro luminescence (OEL) technology, or any other type of display technologies. Sensors 512 may include any number of different types of sensors for measuring a physical quantity (e.g., temperature, force, pressure, acceleration, orientation, light, radiation, etc.). Speaker 514 is configured to output audio information and microphone 516 is configured to receive audio input. One of ordinary skill in the art will appreciate that I/O system 508 may include any number of additional, fewer, and/or different components. For instance, I/O system 508 may include a keypad or keyboard for receiving input, a port for transmitting data, receiving data and/or power, and/or communicating with another device or component, an image capture component for capturing photos and/or videos, etc.

Communication system 518 serves as an interface for receiving data from, and transmitting data to, other devices, computer systems, and networks. For example, communication system 518 may allow computing device 500 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 518 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 518 may provide components configured for wired communication (e.g., Ethernet) in addition to or instead of components configured for wireless communication.

Storage system 520 handles the storage and management of data for computing device 500. Storage system 520 may be implemented by one or more non-transitory machine-readable mediums that are configured to store software (e.g., programs, code modules, data constructs, instructions, etc.) and store data used for, or generated during, the execution of the software. Many of the components (e.g., web browser 110 and application 115) described above may be implemented as software that when executed by a processor or processing unit (e.g., processors 504 of processing system 502) performs the operations of such components and/or processes.

In this example, storage system 520 includes operating system 522, one or more applications 524, I/O module 526, and communication module 528. Operating system 522 includes various procedures, sets of instructions, software components and/or drivers for controlling and managing general system tasks (e.g., memory management, storage device control, power management, etc.) and facilitates communication between various hardware and software components. Operating system 522 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 524 can include any number of different applications installed on computing device 500. For example, web browser 110 and/or application 115 may be installed on computing device 500. Other examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 526 manages information received via input components (e.g., display 510, sensors 512, and microphone 516) and information to be outputted via output components (e.g., display 510 and speaker 514). Communication module 528 facilitates communication with other devices via communication system 518 and includes various software components for handling data received from communication system 518.

One of ordinary skill in the art will realize that the architecture shown in FIG. 5 is only an example architecture of computing device 500, and that computing device 500 may have additional or fewer components than shown, or a different configuration of components. The various components shown in FIG. 5 may be implemented in hardware, software, firmware or any combination thereof, including one or more signal processing and/or application specific integrated circuits.

Figure 6:
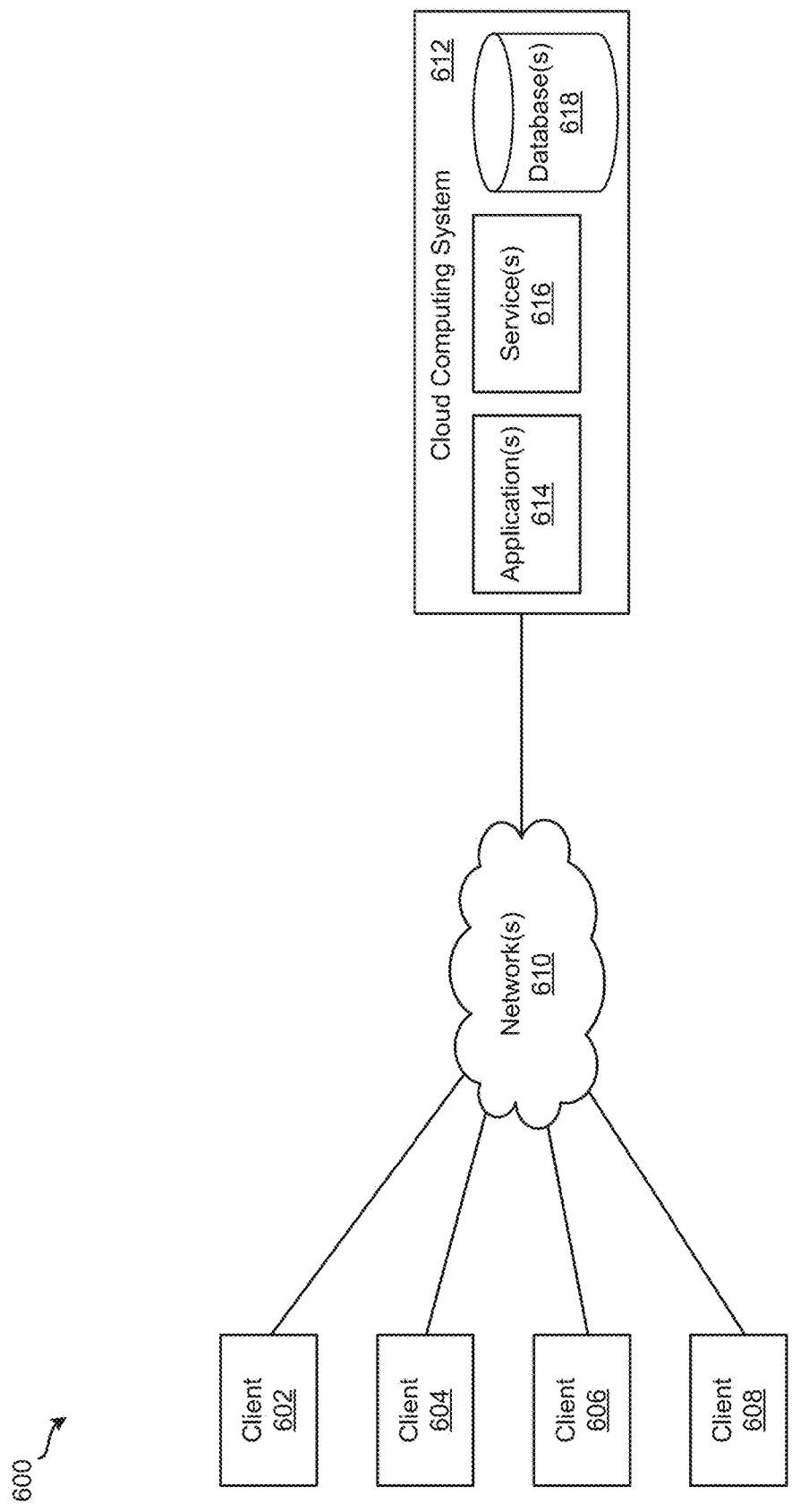
FIG. 6 illustrates an exemplary system, in which various embodiments may be implemented.

FIG. 6 illustrates an exemplary system 600 for implementing various embodiments described above. For example, client devices 602-608 may be used to implement client devices 105a-n and cloud computing system 612 may be used to implement computing system 120. As shown, system 600 includes client devices 602-608, one or more networks 610, and cloud computing system 612. Cloud computing system 612 is configured to provide resources and data to client devices 602-608 via networks 610. In some embodiments, cloud computing system 600 provides resources to any number of different users (e.g., customers, tenants, organizations, etc.). Cloud computing system 612 may be implemented by one or more computer systems (e.g., servers), virtual machines operating on a computer system, or a combination thereof.

As shown, cloud computing system 612 includes one or more applications 614, one or more services 616, and one or more databases 618. Cloud computing system 600 may provide applications 614, services 616, and databases 618 to any number of different customers in a self-service, subscription-based, elastically scalable, reliable, highly available, and secure manner.

In some embodiments, cloud computing system 600 may be adapted to automatically provision, manage, and track a customer's subscriptions to services offered by cloud computing system 600. Cloud computing system 600 may provide cloud services via different deployment models. For example, cloud services may be provided under a public cloud model in which cloud computing system 600 is owned by an organization selling cloud services and the cloud services are made available to the general public or different industry enterprises. As another example, cloud services may be provided under a private cloud model in which cloud computing system 600 is operated solely for a single organization and may provide cloud services for one or more entities within the organization. The cloud services may also be provided under a community cloud model in which cloud computing system 600 and the cloud services provided by cloud computing system 600 are shared by several organizations in a related community. The cloud services may also be provided under a hybrid cloud model, which is a combination of two or more of the aforementioned different models.

In some instances, any one of applications 614, services 616, and databases 618 made available to client devices 602-608 via networks 610 from cloud computing system 600 is referred to as a "cloud service." Typically, servers and systems that make up cloud computing system 600 are different from the on-premises servers and systems of a customer. For example, cloud computing system 600 may host an application and a user of one of client devices 602-608 may order and use the application via networks 610.

Applications 614 may include software applications that are configured to execute on cloud computing system 612 (e.g., a computer system or a virtual machine operating on a computer system) and be accessed, controlled, managed, etc. via client devices 602-608. In some embodiments, applications 614 may include server applications and/or mid-tier applications (e.g., HTTP (hypertext transport protocol) server applications, FTP (file transfer protocol) server applications, CGI (common gateway interface) server applications, JAVA server applications, etc.). Services 616 are software components, modules, application, etc. that are configured to execute on cloud computing system 612 and provide functionalities to client devices 602-608 via networks 610. Services 616 may be web-based services or on-demand cloud services.

Databases 618 are configured to store and/or manage data that is accessed by applications 614, services 616, and/or client devices 602-608. For instance, storages 135-145 may be stored in databases 618. Databases 618 may reside on a non-transitory storage medium local to (and/or resident in) cloud computing system 612, in a storage-area network (SAN), on a non-transitory storage medium local located remotely from cloud computing system 612. In some embodiments, databases 618 may include relational databases that are managed by a relational database management system (RDBMS). Databases 618 may be a column-oriented databases, row-oriented databases, or a combination thereof. In some embodiments, some or all of databases 618 are in-memory databases. That is, in some such embodiments, data for databases 618 are stored and managed in memory (e.g., random access memory (RAM)).

Client devices 602-608 are configured to execute and operate a client application (e.g., a web browser, a proprietary client application, etc.) that communicates with applications 614, services 616, and/or databases 618 via networks 610. This way, client devices 602-608 may access the various functionalities provided by applications 614, services 616, and databases 618 while applications 614, services 616, and databases 618 are operating (e.g., hosted) on cloud computing system 600. Client devices 602-608 may be computer system 400 or computing device 500, as described above by reference to FIGS. 4 and 5, respectively. Although system 600 is shown with four client devices, any number of client devices may be supported.

Networks 610 may be any type of network configured to facilitate data communications among client devices 602-608 and cloud computing system 612 using any of a variety of network protocols. Networks 610 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a computing device, the program comprising sets of instructions for:

receiving, at an integrated development environment (IDE) from a client device, a project for an existing application, the project organizes source code for the existing application;

receiving from the client device a request to add an offline mode to the existing application, the existing application not having an offline mode;

in response to receiving the request, adding additional source code in the project for creating the offline mode in the existing application, wherein the additional source code comprises instructions for creating a local storage on the client device, instructions for retrieving data for the generated application from a computing system, and instructions for storing the data for the generated application in the local storage; and generating, by the IDE from the project, an application configured for execution on the client device, wherein the generated application is a version of the existing application that is operable in the offline mode.

2. The non-transitory machine-readable medium of claim 1, wherein the additional source code further comprises instructions for retrieving the data from the local storage and presenting the data on a display of the client device.

3. The non-transitory machine-readable medium of claim 1, wherein the additional source code further comprises instructions for receiving modifications to the data for the generated application, instructions for storing the modifications to the data for the generated application in the local storage, instructions for determining that the client device has a connection to the computing system, instructions for, based on the determination, sending the modifications to the data for the generated application to the computing system in order for the computing system to synchronize the data for the generated application that is stored on the computing system with the data for the generated application store in the local storage.

4. The non-transitory machine-readable medium of claim 3, wherein the program further comprises a set of instructions for receiving from a user of the client device a request to synchronize the modifications to the data for the generated application stored in the local storage with the data stored in the computing system.

5. The non-transitory machine-readable medium of claim 1, wherein the additional source code is also for defining one or more selectable user interface (UI) items for the existing application for use when operating in the offline mode.

6. The non-transitory machine-readable medium of claim 1, wherein the client device is a first client device, wherein the existing application is an application that has been implemented, compiled, and installed on a second client device.

7. A method comprising:

receiving, at an integrated development environment (IDE) from a client device, a project for an existing application, the project organizes source code for the existing application;

receiving from the client device a request to add an offline mode to the existing application, the existing application not having an offline mode;

in response to receiving the request, adding additional source code in the project for creating the offline mode in the existing application, wherein the additional source code comprises instructions for creating a local storage on the client device, instructions for retrieving data for the generated application from a computing system, and instructions for storing the data for the generated application in the local storage; and generating, by the IDE from the project, an application configured for execution on the client device, wherein the generated application is a version of the existing application that is operable in the offline mode.

8. The method of claim 7, wherein the additional source code further comprises instructions for retrieving the data from the local storage and presenting the data on a display of the client device.

9. The method of claim 7, wherein the additional source code further comprises instructions for receiving modifications to the data for the generated application, instructions for storing the modifications to the data for the generated application in the local storage, instructions for determining that the client device has a connection to the computing system, instructions for, based on the determination, sending the modifications to the data for the generated application to the computing system in order for the computing system to synchronize the data for the generated application that is stored on the computing system with the data for the generated application store in the local storage.

10. The method of claim 9, further comprising receiving from a user of the client device a request to synchronize the modifications to the data for the generated application stored in the local storage with the data stored in the computing system.

11. The method of claim 7, wherein the additional source code is also for defining one or more selectable UI items for the existing application for use when operating in the offline mode.

12. The method of claim 7, wherein the client device is a first client device, wherein the existing application is an application that has been implemented, compiled, and installed on a second client device.

13. A system comprising:

a set of processing units; and a non-transitory machine-readable medium storing instructions that when executed by at least one processing unit in the set of processing units cause the at least one processing unit to:

receive, at an integrated development environment (IDE) from a client device, a project for an existing application, the project organizes source code for the existing application;

receive from the client device a request to add an offline mode to the existing application, the existing application not having an offline mode;

in response to receiving the request, include additional source code in the project for creating the offline mode in the existing application, wherein the additional source code comprises instructions for creating a local storage on the client device, instructions for retrieving data for the generated application from a computing system, and instructions for storing the data for the generated application in the local storage; and generate, by the IDE from the project, an application configured for execution on the client device, wherein the generated application is a version of the existing application that is operable in the offline mode.

14. The system of claim 13, wherein the additional source code further comprises instructions for retrieving the data from the local storage and presenting the data on a display of the client device.

15. The system of claim 13, wherein the additional source code further comprises instructions for receiving modifications to the data for the generated application, instructions for storing the modifications to the data for the generated application in the local storage, instructions for determining that the client device has a connection to the computing system, instructions for, based on the determination, sending the modifications to the data for the generated application to the computing system in order for the computing system to synchronize the data for the generated application that is stored on the computing system with the data for the generated application store in the local storage.

16. The system of claim 15, wherein the instructions further cause the at least one processing unit to receive from a user of the client device a request to synchronize the modifications to the data for the generated application stored in the local storage with the data stored in the computing system.

17. The system of claim 13, wherein the additional source code is also for defining one or more new selectable UI items for the existing application for use when operating in the offline mode.

* * * * *